United States Patent [19]
Esquivel

[11] Patent Number: 5,972,456
[45] Date of Patent: Oct. 26, 1999

[54] MULTI-PLY TOILET PAPER PRODUCT

[76] Inventor: Roberto Esquivel, 11427 E. Mc Laren St., Norwalk, Calif. 90650

[21] Appl. No.: 09/046,250

[22] Filed: Mar. 23, 1998

[51] Int. Cl.⁶ .................................................. B32B 3/10
[52] U.S. Cl. ........................... 428/43; 428/154; 428/535
[58] Field of Search .................. 428/43, 154, 535, 428/906; 162/123, 231; 242/160.1

[56] References Cited

U.S. PATENT DOCUMENTS

| | | | |
|---|---|---|---|
| 1,780,275 | 1/1930 | Randerson | 428/43 |
| 3,017,317 | 1/1962 | Voigtman et al. | 162/111 |
| 3,954,554 | 5/1976 | Curry et al. | 162/104 |
| 3,994,771 | 11/1976 | Morgan, Jr. et al. | 162/113 |
| 4,100,017 | 7/1978 | Flautt, Jr. | 162/111 |
| 4,166,001 | 8/1979 | Dunning et al. | 162/111 |
| 4,344,818 | 8/1982 | Nuttall et al. | 162/111 |
| 5,227,023 | 7/1993 | Pounder et al. | 162/101 |
| 5,437,908 | 8/1995 | Demura et al. | 428/154 |

*Primary Examiner*—Alexander Thomas
*Attorney, Agent, or Firm*—Eric Karich

[57] ABSTRACT

A soft, absorbent toilet paper product has a stack of 6 sheets of toilet paper, each of the sheets preferably has a thickness of between 0.005–0.006 inches, and the product has an overall thickness great enough for use the product without folding prior to use, preferably approximately 0.04 inches in overall thickness. The product has a length of approximately 5.5 inches, and a width of approximately 4.5 inches. The sheets are preferably embossed to form a weak bond between the sheets to hold the product together in a single unit. In its preferred embodiment, a plurality of the sheets connected with linear tear portions and rolled lengthwise around a cylinder to form a roll of the product.

20 Claims, 1 Drawing Sheet

MULTI-PLY TOILET PAPER PRODUCT

BACKGROUND OF THE INVENTION

1. Field of the Invention

This invention relates generally to an improved toilet paper product, and more particularly to a toilet paper product having greater length and thickness than ordinary toilet paper products, allowing the user to utilize the product without pre-folding the toilet paper.

2. Description of Related Art

Sanitary tissue products, which are also referred to as bathroom tissue and toilet tissue products, generally fall within one of four categories based on their composition and structure: One to two ply products, made of either ordinary or high density paper. These products are usually produced and marketed in roll form with individual sheets of the tissue defined by perforations extending across the width of the product. The product is then wound lengthwise on a hollow core.

The following art defines the present state of this field:

Flautt, U.S. Pat. No. 4,100,017 is a sanitary tissue product which is a laminate formed from two dissimilar paper webs. When a web of low density, high bulk process paper is united with a web of conventional paper, a product possessing absorbency, softness, flexibility, and bulk properties similar to those of a product comprising two webs of the low density, high process paper is produced. Variations taught by the invention include the use of two paper webs having different creping characteristics to form the laminated sanitary tissue. The teachings of the invention can be extended to other products such as paper towels. Morgan, Jr. et al., U.S. Pat. No. 3,994,771 is a wet-laid composite, soft, bulky, and absorbent paper structure prepared from two or more layers of furnish which are preferably comprised of different fiber types. The layers are preferably formed from the deposition of separate streams of dilute fiber slurries, the fibers typically being relatively long softwood and relatively short hardwood fibers as used in tissue paper-making, upon one or more endless foraminous screens. The layers are subsequently combined to form a unitary web, and the layered, unitary web is de-watered by the application of fluid forces. The moist, layered web is thereafter transferred to an open mesh drying/imprinting fabric. The application of a fluid force to the web creates patterned discrete areas of fibers numbering from about 100 to about 3600 per square inch of projected surface area on the side of the web which contacts the drying/imprinting fabric. The undensified discrete areas which correspond to the mesh openings in the drying/imprinting fabric extend outwardly from the fabric side of the layered web and generally assume the form of totally-enclosed pillows, conically grouped arrays of fibers, combinations thereof or the like. Following transfer of the moist, layered paper web to the drying/imprinting fabric, the web is thermally predried to a fiber consistency of at least about 30 percent. The thermally predried, layered paper web may then be compacted in discrete areas corresponding to the knuckles of the drying/imprinting fabric to impart strength and to adhere the web of the surface of a dryer drum for final drying and/or creping. The above described layered structures exhibit significantly improved bulk, flexibility, compressibility, drape, and absorptive capacity when compared to prior art paper sheets formed by similar processing techniques from a single slurry comprised of a homogeneous mixture of similar fibers. In addition, the structures which are stratified with respect to fiber type typically yield finished paper sheets having significantly improved tactile impression and softness.

Dunning et al., U.S. Pat. No. 4,166,001 is a process for directly forming multiple layer web, and creping such webs to provide absorbent, soft and bulky, creped tissue. The process produces a laminar fibrous formation with outer layers of strongly bonded fibers separated by an intermediate central section of weakly bonded fibers, which outer layers are creped such that the crepe in the other outer layer. The process utilizes a multiple slice inlet with different fiber stock supplied via the inlet to form the weakly bonded central layer of the fibrous formation. The base formation is subjected to two creping operations: one side of the fibrous is adhered to the surface of a dryer and creped therefrom, the once-creped web is inverted, and the other side adhered to the surface of a dryer and again creped. Therefrom, the process produces a finely creped, soft and bulky outer surface of layers of strongly bonded fibers which are capable of delamination. Each layer is sheared away from the other during the creping operations because of the weakly bonded intermediate fibrous section and the final product simulating a two ply tissue in bulk and softness while having been formed as a single ply.

Curry et al., U.S. Pat. No. 3,954,554 is a method and apparatus for making a multi-ply paper sheet wherein a first web is formed by wet-laying fibres and a second web is formed by dry-laying fibres, and the two webs being combined to form a multi-ply sheet. The dry-laid web is produced by depositing dry fibres on a supporting band and consolidating the web by hot moist pressing before transferring to the first wet-laid web.

Nuttall et al., U.S. Pat. No. 4,344,818 is a method and apparatus especially adapted to produce a ply separable web requiring substantially less energy input for drying. The apparatus comprises a headbox having at least three stock flow channels, the outer channels being adapted to convey conventional aqueous stock solutions, with at least one inner channel adapted to convey airborne fibers. The resulting web, having a significant portion of the fibers in a dry state, requires less energy to dry, and the distinct layers of provide shear zones therebetween which permit ply separating upon creping. Different fiber types may be provided indifferent layers depending upon product attributes desired, and the products may be conventionally dried or may be through-dried.

Pounder et al., U.S. Pat. No. 5,227,023 describes novel multi-layer paper and tissue products, which possess strength, softness and absorbency. The products comprise either at least two foam deposited paper layers, wherein the foams have different air contents therein, or foam and water deposited layers. The layers can be deposited at about identical feed pressures from a single headbox while still possessing differing tensile strength ratios. Novel processes for forming such products are also provided.

Demura et al., U.S. Pat. No. 5,437,908 describes a bathroom tissue comprising an intermediate layer having on one side thereof a top layer, and on the other side thereof a bottom layer. The intermediate layer is comprised of about 100% wood pulp and the top and bottom layers are comprised of wood and rayon pulps mixed in a weight ratio of about 40–80:60–20. The process for producing the bathroom tissue is also disclosed.

The prior art teaches two ply toilet paper and various other paper products having multiple layers. However, the prior art does not teach a toilet paper product having 4–10 layers of tissue, allowing use of the product without folding. There is presently a great need of such a product, especially for children who have difficulty with correctly folding traditional paper. The present invention fulfills these needs and provides further related advantages as described in the following summary.

SUMMARY OF THE INVENTION

The present invention teaches certain benefits in construction and use that give rise to the objectives described below.

The present invention provides a soft, absorbent toilet paper product comprising a stack of between 4–10 sheets, preferably 6 sheets, of toilet paper. Each of the individual sheets preferably has a thickness of between 0.005–0.006 inches, and the overall product has a thickness great enough for use the product without folding prior to use, preferably between 0.02–0.06 inches, and most preferably approximately 0.04 inches in overall thickness. Each single-use pad of the product has a length of between 5.0–6.5 inches, preferably approximately 5.5 inches, and a width of between 3.5–5.0 inches, preferably 4.5 inches. The sheets are preferably embossed to form a weak bond between the sheets to hold the product together in a single unit.

In its preferred embodiment, a plurality of the single-use pads are rolled lengthwise around a cylinder to form a roll of the product. The product has an overall length of over 5 feet, the product being separated into single-use pads by a plurality of perforations that form a plurality of linear tearing portions. The linear tearing portions are formed across the width of the sheets at intervals of between 5.0–6.5 inches, preferably every 5.5 inches. This allows the roll of product to be easily torn into the individual single-use pads having the preferred length.

A primary objective of the present invention is to provide a soft, absorbent toilet paper product having advantages not taught by the prior art.

Another objective is to provide a toilet paper product having a thickness great enough for use the product without folding prior to use, but not thick enough or solid enough to clog a conventional toilet. The ability to use a toilet paper product without folding is especially important for small children, who often have difficulty folding prior art toilet paper to a proper thickness.

Another objective is to provide a toilet paper product having a length great enough for use the product without folding prior to use, but not long enough to clog a conventional toilet.

Another objective is to provide a toilet paper product that can contain inner layers having uncomfortable paper compositions such as high density paper while still presenting a soft and absorbent outer surface for the comfort of the user. This allows the toilet paper manufacturer to produce paper with special qualities, such as a water resistant layer, without sacrificing comfort.

Another objective is to provide a toilet paper product that is improved over the prior art but still compatible with conventional toilet paper dispensers.

Another objective is to provide a toilet paper product that is embossed to form a weak bond between the sheets to hold the product together in a single unit.

A further objective is to provide a toilet paper product that is embossed only at the ends of the product, allowing the user to tear out individual sheets of the product for use as facial tissue.

Other features and advantages of the present invention will become apparent from the following more detailed description, taken in conjunction with the accompanying drawings, which illustrate, by way of example, the principles of the invention.

BRIEF DESCRIPTION OF THE DRAWING

The accompanying drawings illustrate the present invention. In such drawings.

DETAILED DESCRIPTION OF THE INVENTION

Figure 1:
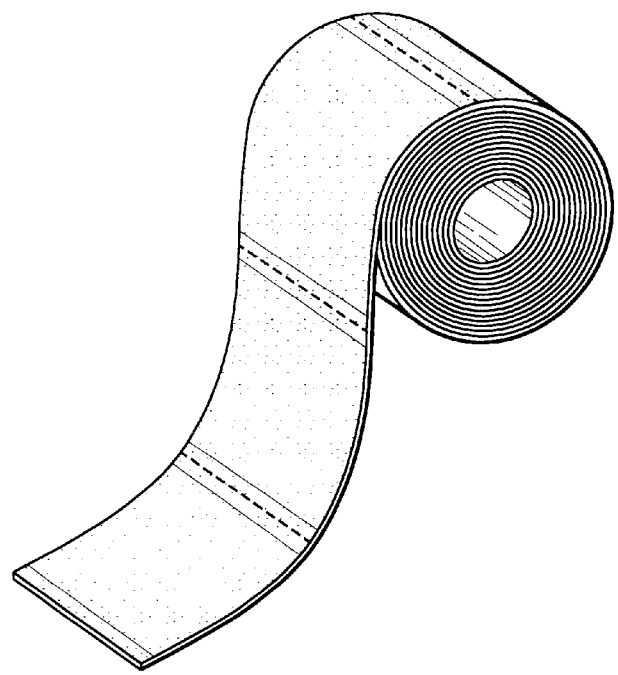
FIG. 1 is a perspective view of a roll of the present invention.
Figure 2:
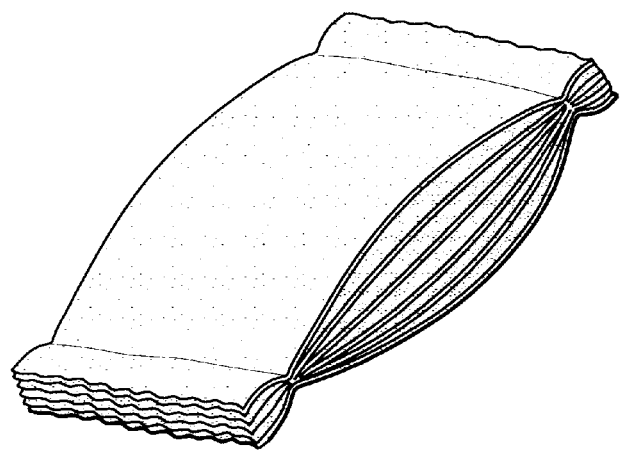
FIG. 2 is a perspective view of a single unit of the invention, enlarged to show the multiple layers of the product, the torn perforations, and the preferred embossing of the product near the perforations.

The above described drawing figures illustrate the invention, a soft, absorbent toilet paper product 10 comprising 4–10 sheets 14 of toilet paper forming a stack 12. The product 10 preferably contains between 5–7 sheets 14 and most preferably contains 6 sheets 14. Each of the individual sheets 14 is preferably between 0.005–0.006 inches thick. It is critical that the stack 12 has a thickness T great enough for use the product 10 without folding prior to use. Prior art toilet paper requires that the user fold the product 10 several times before use. This can be a great difficulty for some people, especially children. By producing a product that is already the appropriate thickness T, much effort is saved and the process is greatly simplified for small children. Exhaustive research has shown that the product 10 preferably has a thickness T of between 0.02–0.06 inches. Lesser amounts, like the prior art that is approximately 0.01 inches, require folding before use. Greater amounts tend to clog ordinary plumbing and are thus undesirable. The product 10 preferably has an overall thickness T of 0.03–0.05 inches, and most preferably is approximately 0.04 inches in thickness T.

The sheets 14 may be made of various cellulosic and other fibers that are normally made in the fabrication of tissue products. The useful cellulosic fibers include chemical wood pulp fibers, mechanically produced wood pulp fibers, cotton fibers, and the like. Various synthetic fibers such as nylon and rayon may be added to improve certain qualities of the paper as desired. The different types of toilet paper products and their creping and treatment are discussed at length in the following U.S. patents: Flautt, Jr., U.S. Pat. No. 4,100,017, Morgan, Jr. et al., U.S. Pat. No. 3,994,771, and Dunning et al., U.S. Pat. No. 4,166,001, the aforesaid patents being hereby incorporated by reference in full. In the present invention, the sheets 14 are preferably all made of high-bulk and low-density paper, because this paper is soft and absorbent, allowing the user with the greatest possible comfort. However, only the outer sheets 14A of the product 10 are required to be soft and absorbent. It is within the scope of this invention to produce a product having middle sheets 14B made of paper having a greater density, or made of various synthetic materials having desired properties because such placement may provide a benefit without causing the user discomfort during use. These optional middle sheets 14B dense layers may serve a second purpose, such as preventing fluids from penetrating completely through the product 10 and contaminating the user's hands. One of the specific benefits of this configuration is that many different types of paper may be utilized which still providing the user with a soft exterior layer. In the preferred embodiment of this invention, however, the product 10 currently contains only multiple layers of high-bulk and low-density tissue.

In addition to a greater thickness T, another improvement of this invention over the prior art is that product 10 is formed as single-use pads 20 which have a length L and width W suitable for easy individual use. Each of the pads 20 has a length L of between 5.0–6.5 inches. Prior art toilet paper generally has a length L of approximately 4.5 inches; however, this is too short for use without folding multiple sections of toilet paper. By extending the length L of each of the sheets 14 of the product 10, the user is able to use a single section of the product 10 more comfortably without folding multiple sections. Exhaustive testing by the inventor has shown that the sheets 14 preferably have a length L of approximately 5.5 inches.

To allow the product 10 to fit within common toilet paper dispensers already in use, each of the pads 20 has a width W of between 3.5–5.0 inches, preferably 4.5 inches. The width W of the product 10 is not novel, and indeed is designed to correspond to the prior art for purposes of standardization.

In its preferred embodiment, a plurality of the pads 20 are rolled lengthwise around a cardboard cylinder 30 to form a roll of the product 10. The cylinder 30 preferably has a diameter of approximately 1.5 inches and a width approximately equal to the width W of the sheets 14. It is preferred that the cylinder 30 have dimensions similar to prior art toilet paper rolls so that products made according to this invention can be used with the toilet paper dispensers currently in use; however, these dimensions are not a part of the inventive nature of this invention, and the specific structure and dimensions of the roll can be changed without altering the novelty of this invention. When the product 10 is stored as a roll of toilet paper, the product 10 has the same dimensions as described above, except the product 10 is, in total, over 5 feet long. The product 10 further contains a plurality of perforations 40 that form a plurality of linear tearing portions 50. The linear tearing portions 50 are formed across the width of the sheets 14 at intervals of between 5.0–6.5 inches, preferably every 5.5 inches. This allows the roll of product 10 to be easily torn into the individual pads 20 having the preferred length L.

The sheets 14 are preferably embossed to form a weak bond or embossing 60 between the sheets 14. Such an embossing 60 or "quilting" is well known in the art. In its most preferred embodiment, the embossing 60 forms a line on either side of each of the plurality of linear tearing portions 50. The embossing 60 holds the plurality of sheets 14 together in a single unit. By forming the embossing 60 only on the ends of the pads 20, as described, the softness of the product 10 is increased; and the embossing 60 allows one or two sheets 14 of the product 10 to be easily torn away for use as facial tissue. The user is able to simply place a pad of the product 10 in his or her pocket and he or she will have a ready supply of facial tissue.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. A toilet paper product comprising 4–10 sheets of toilet paper forming a stack, each of the sheets having a width of between 3.5–5.0 inches and a length of between 5.0–6.5 inches, the stack having an overall thickness of between 0.02–0.06 inches.

2. The toilet paper product of claim 1 wherein the sheets are embossed to form a weak bond between the sheets.

3. The roll of toilet paper of claim 2 wherein the sheets are embossed only in proximity to the perforations.

4. The toilet paper product of claim 1 wherein the sheets have a width of approximately 4.5 inches.

5. The toilet paper product of claim 1 wherein the sheets have a length of approximately 5.5 inches.

6. The toilet paper product of claim 1 wherein the product contains between 5–7 sheets.

7. The toilet paper product of claim 1 wherein the product contains 6 sheets.

8. The toilet paper product of claim 1 wherein the stack has a thickness of 0.03–0.05 inches.

9. The toilet paper product of claim 1 wherein the stack has a thickness of approximately 0.04 inches.

10. The toilet paper product of claim 1 wherein the sheets each have a thickness of between 0.005–0.006 inches.

11. A roll of soft, absorbent toilet paper comprising:

4–10 sheets of toilet paper forming a stack, each of the sheets having a width of between 3.5–5.0 inches and a length of over 5 feet;

the stack having a thickness of between 0.02–0.06 inches;

the stack having a plurality of perforations which penetrate all of the sheets to form a series of linear tearing portions, the linear tearing portions being formed across the width of the sheets at intervals of between 5.0–6.5 inches, allowing the product to be easily torn into individual pads; and the sheets being rolled around a cylinder having a diameter of approximately 1.5 inches and a width approximately equal to the width of the sheets.

12. The roll of toilet paper of claim 11 wherein the sheets are embossed to form a weak bond between the sheets.

13. The roll of toilet paper of claim 12 wherein the sheets are embossed only in proximity to the perforations.

14. The roll of toilet paper of claim 11 wherein the sheets have a width of approximately 4.5 inches.

15. The roll of toilet paper of claim 11 wherein the linear tearing portions are formed at intervals of approximately 5.5 inches.

16. The roll of toilet paper of claim 11 wherein the stack contains between 5–7 sheets.

17. The roll of toilet paper of claim 11 wherein the stack contains 6 sheets.

18. The roll of toilet paper of claim 11 wherein the stack has a thickness of 0.03–0.05 inches.

19. The roll of toilet paper of claim 11 wherein the stack has a thickness of approximately 0.04 inches.

20. A roll of soft, absorbent toilet paper comprising:

4–10 sheets of toilet paper forming a stack, each of the sheets having a width of between 3.5–5.0 inches and a length of over 5 feet;

the stack being thick enough for use without folding;

the stack having a plurality of perforations through each of the sheets to form a series of linear tearing portions, the linear tearing portions being formed across the width of the sheets at intervals of between 5.0–6.5 inches, allowing the product to be easily torn into individual pads; and the sheets being rolled around a cylinder having a diameter of approximately 1.5 inches and a width approximately equal to the width of the sheets.

* * * * *